US012632610B2

(12) United States Patent
Hutter

(10) Patent No.: US 12,632,610 B2
(45) Date of Patent: May 19, 2026

(54) DATA-GATING BASED MASKING

(71) Applicant: Rambus Inc., San Jose, CA (US)

(72) Inventor: Michael Hutter, Vienna (AT)

(73) Assignee: Rambus Inc., San Jose, CA (US)

( * ) Notice: Subject to any disclaimer, the term of this patent is extended or adjusted under 35 U.S.C. 154(b) by 219 days.

(21) Appl. No.: 18/039,890

(22) PCT Filed: Nov. 30, 2021

(86) PCT No.: PCT/US2021/061251
§ 371 (c)(1),
(2) Date: Jun. 1, 2023

(87) PCT Pub. No.: WO2022/125338
PCT Pub. Date: Jun. 16, 2022

(65) Prior Publication Data
US 2024/0045998 A1     Feb. 8, 2024

Related U.S. Application Data

(60) Provisional application No. 63/124,444, filed on Dec. 11, 2020.

(51) Int. Cl.
G06F 21/75 (2013.01)

(52) U.S. Cl.
CPC .................................. G06F 21/755 (2017.08)

(58) Field of Classification Search
CPC ........... G06F 21/755; G06F 2207/7219; G06F 2207/7238; G06F 2207/7266; G06F 7/02;
(Continued)

(56) References Cited

U.S. PATENT DOCUMENTS

| | | | |
|---|---|---|---|
| 6,191,683 B1 | 2/2001 | Nygaard, Jr. | |
| 10,712,385 B2 | 7/2020 | Hutter et al. | |

(Continued)

OTHER PUBLICATIONS

EP Communication Pursuant to Rule 164(1) EPC, Partial Supplementary European Search Report with Mail Date Sep. 30, 2024 re: EP Appln. No. 21904127.4. 14 pages.
(Continued)

*Primary Examiner* — Baotran N To
(74) *Attorney, Agent, or Firm* — The Neudeck Law Firm, LLC

(57) ABSTRACT

A bundled-data protocol can be used to synchronize the data flow in the mask shares. A random synchronization token is input and "bundled" with the combinatorial logic of a share. An additional output from the combinatorial logic is also provided such that when the original combinational output is exclusive OR'd (XOR'd) with the additional output yields the random synchronization token. When the XOR of the original and additional outputs, and the input synchronization token are equal, it indicates that the computation of the combinatorial logic is complete. Thus, the result of the comparison of the XOR of the original and additional outputs, and the input synchronization token may be used as a "done" or "enable" handshake signal to allow asynchronous gating elements (e.g., AND gates, asynchronous set-reset latches, and/or state-holding elements like the Muller C-element, etc.) to start and stop the flow of data in a mask share.

13 Claims, 15 Drawing Sheets

GENERATE A FIRST OUTPUT SHARE OF DATA-GATING BASED MASKING (DGM) CIRCUITRY BASED ON A FIRST INPUT SHARE VALUE AND A SECOND INPUT SHARE VALUE
802

GENERATE A SECOND OUTPUT SHARE OF THE DGM CIRCUITRY BASED ON A FIRST TOKEN VALUE, THE FIRST INPUT SHARE VALUE, AND THE SECOND INPUT SHARE VALUE
804

GENERATE A LINEARLY PROCESSED FIRST REGENERATED TOKEN VALUE BASED ON THE FIRST OUTPUT SHARE OF THE DGM CIRCUITRY AND THE SECOND OUTPUT SHARE OF THE DGM CIRCUITRY
806

OUTPUT A FIRST ENABLE SIGNAL BASED ON A LINEARLY PROCESSED FIRST TOKEN VALUE AND THE LINEARLY PROCESSED FIRST REGENERATED TOKEN VALUE.
808

(58) Field of Classification Search
CPC . G06F 21/72; H04L 2209/04; H04L 2209/12; H04L 9/003; G09C 1/00
See application file for complete search history.

(56) References Cited

U.S. PATENT DOCUMENTS

| | | | |
|---|---|---|---|
| 2006/0039179 A1 | 2/2006 | Luk et al. | |
| 2006/0200514 A1 | 9/2006 | Fischer et al. | |
| 2007/0018690 A1 | 1/2007 | Behrends et al. | |
| 2015/0169904 A1 | 6/2015 | Leiserson et al. | |
| 2019/0362104 A1* | 11/2019 | Leiserson | G06F 21/71 |
| 2021/0097175 A1 | 4/2021 | Hoerder | |
| 2022/0405428 A1* | 12/2022 | Leiserson | G06F 21/72 |

OTHER PUBLICATIONS

Kumar, Kundan et al., "Design of a differential power analysis resistant masked AES S-Box," International Conference on Cryptology in India, Indocrypt 2007, LNCS 4859, Berlin, Heidelberg: Springer Berlin Heidelberg, 2007. 11 pages.

Fischer, Wieland et al., "Masking at Gate Level in the Presence of Glitches", Proceedings of the 7th International Conference on Cryptographic Hardware and Embedded Systems (CHES'05). Springer-Verlag, Berlin, Heidelberg, 2005, pp. 187-200, 16 pages.

Mangard, Stefan et al., "Pinpointing the Side-Channel Leakage of Masked AES Hardware Implementations *", Proceedings of the 8th International Conference on Cryptographic Hardware and Embedded Systems (CHES'06). Springer-Verlag, Berlin, Heidelberg, 2006, pp. 76-90, 15 pages.

Mangard, Stefan et al., "Side-Channel Leakage of Masked CMOS Gates*", Proceedings of the 2005 International Conference on Topics in Cryptology (CT-RSA'05). Springer-Verlag, Berlin, Heidelberg, 2005, pp. 351-365, 15 pages.

Marioka, Sumio et al., "An Optimized S-Box Circuit Architecture for Low Power AES Design", Revised Papers from the 4th International Workshop on Cryptographic Hardware and Embedded Systems (CHES '02). Springer-Verlag, Berlin, Heidelberg, 2002, pp. 172-186, 15 pages.

Notification of Transmittal of the International Search Report and the Written Opinion of the International Searching Authority, or the Declaration with Mail Date Apr. 26, 2022 re: Int' Appin. No. PCT/US2021/061251. 19 pages.

Suzuki, Daisuke et al., "Random Switching Logic: A Countermeasure Against DPA Based on Transition Probability", IACR Cryptology ePrint Archive. 2004, 346, 16 pages.

Zeng, Juanli et al., "Improvement on Masked S-box Hardware Implementation", 2012 International Conference on Innovations in Information Technology (IIT), pp. 113-116, 5 pages.

* cited by examiner

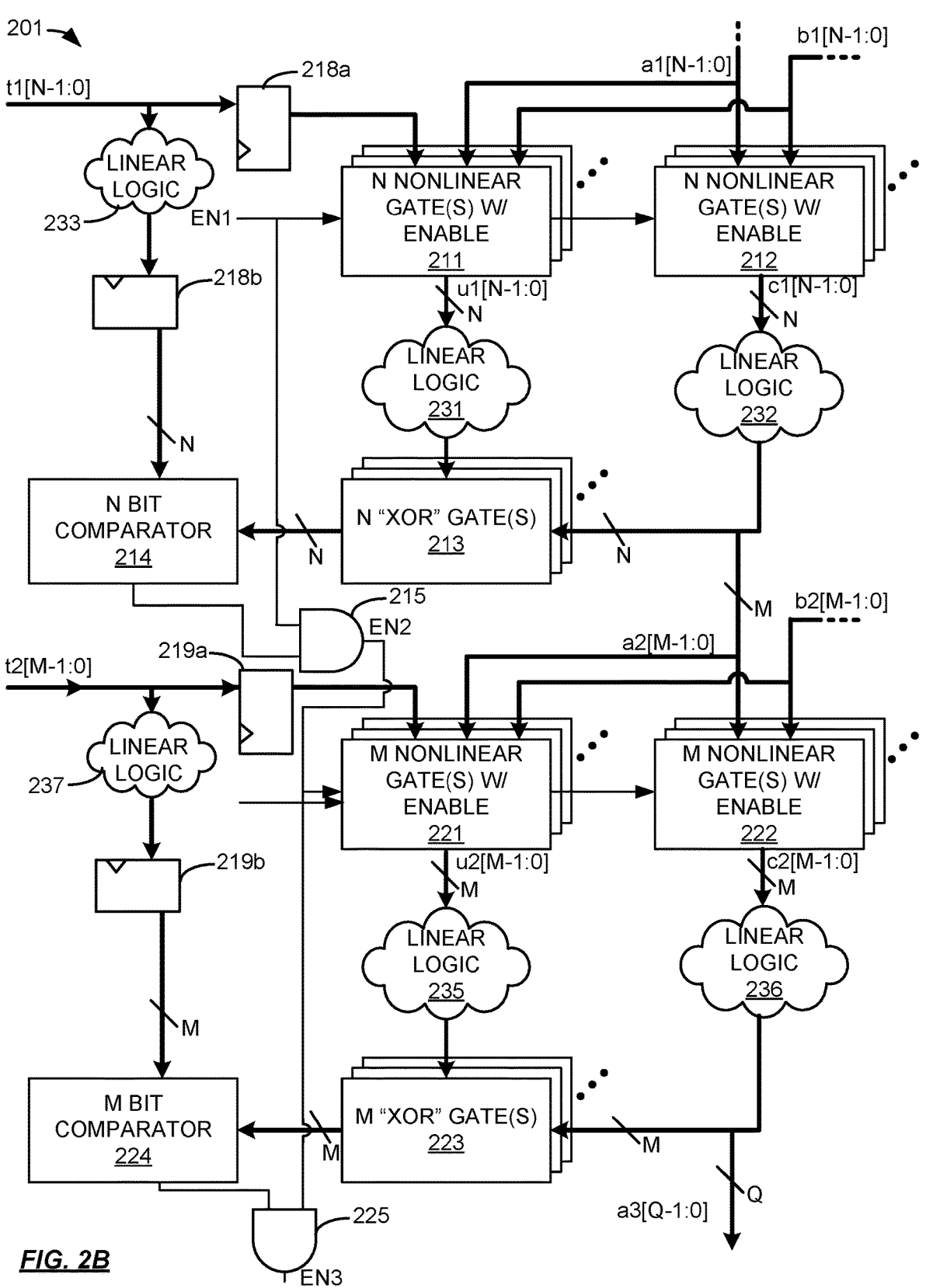
_FIG. 2B_

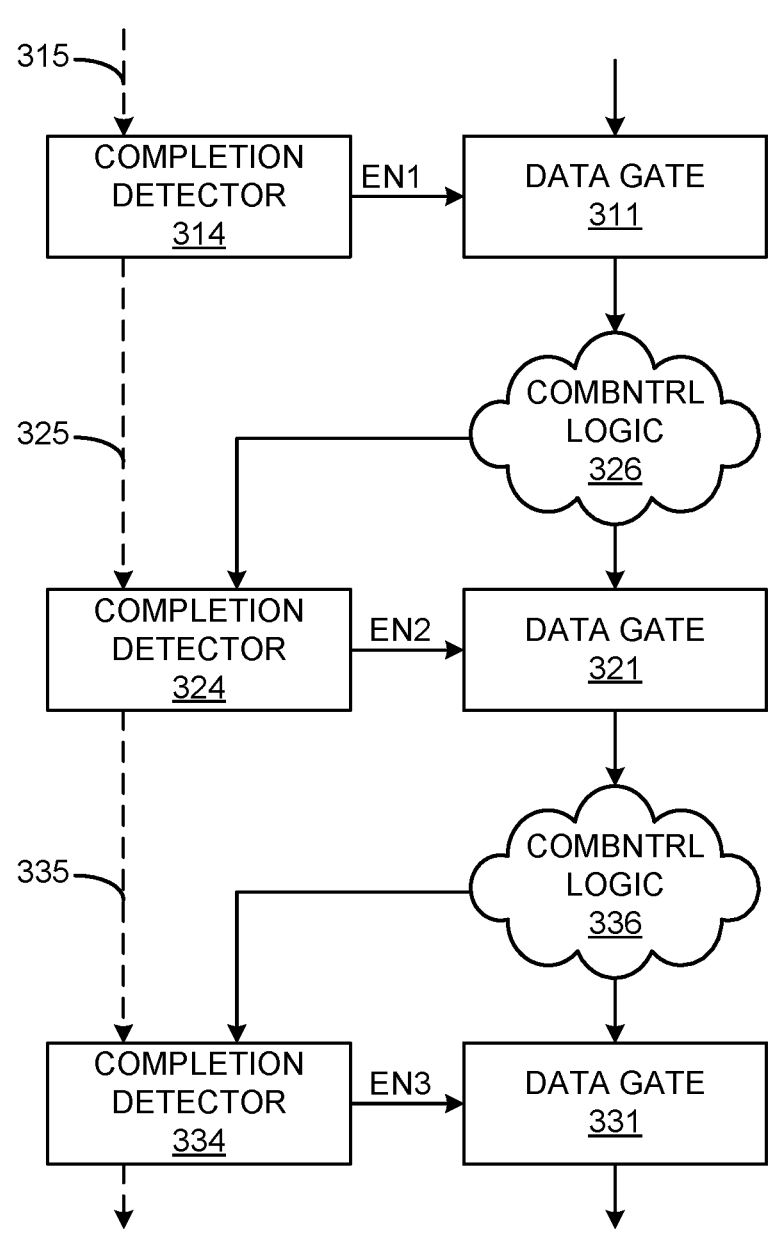
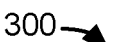
*FIG. 3*

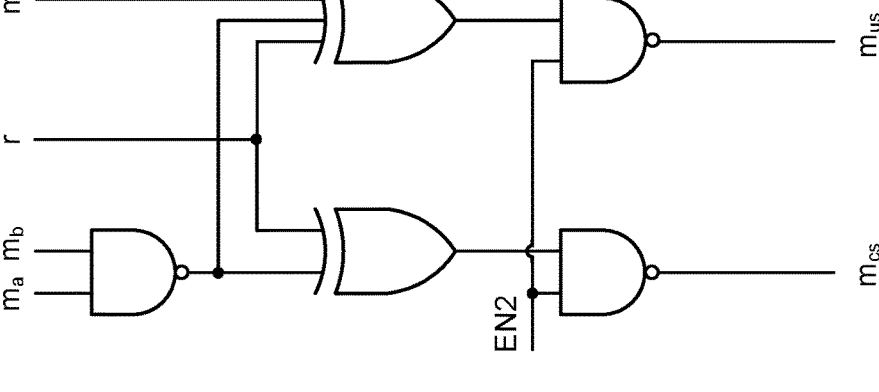
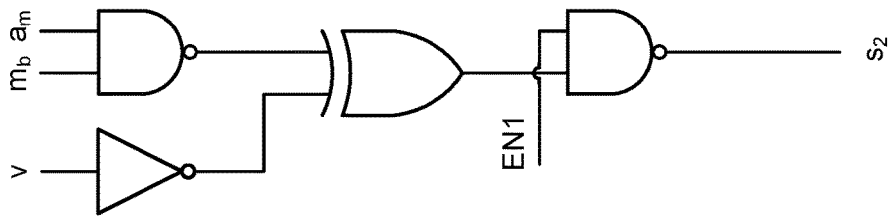
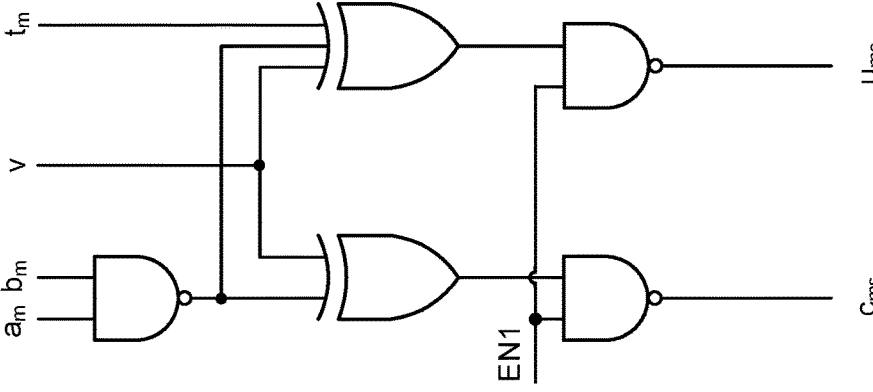
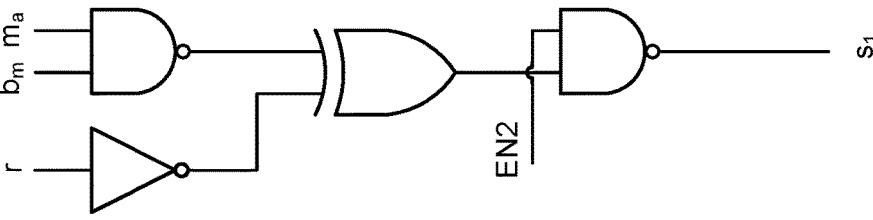
*FIG. 4B*

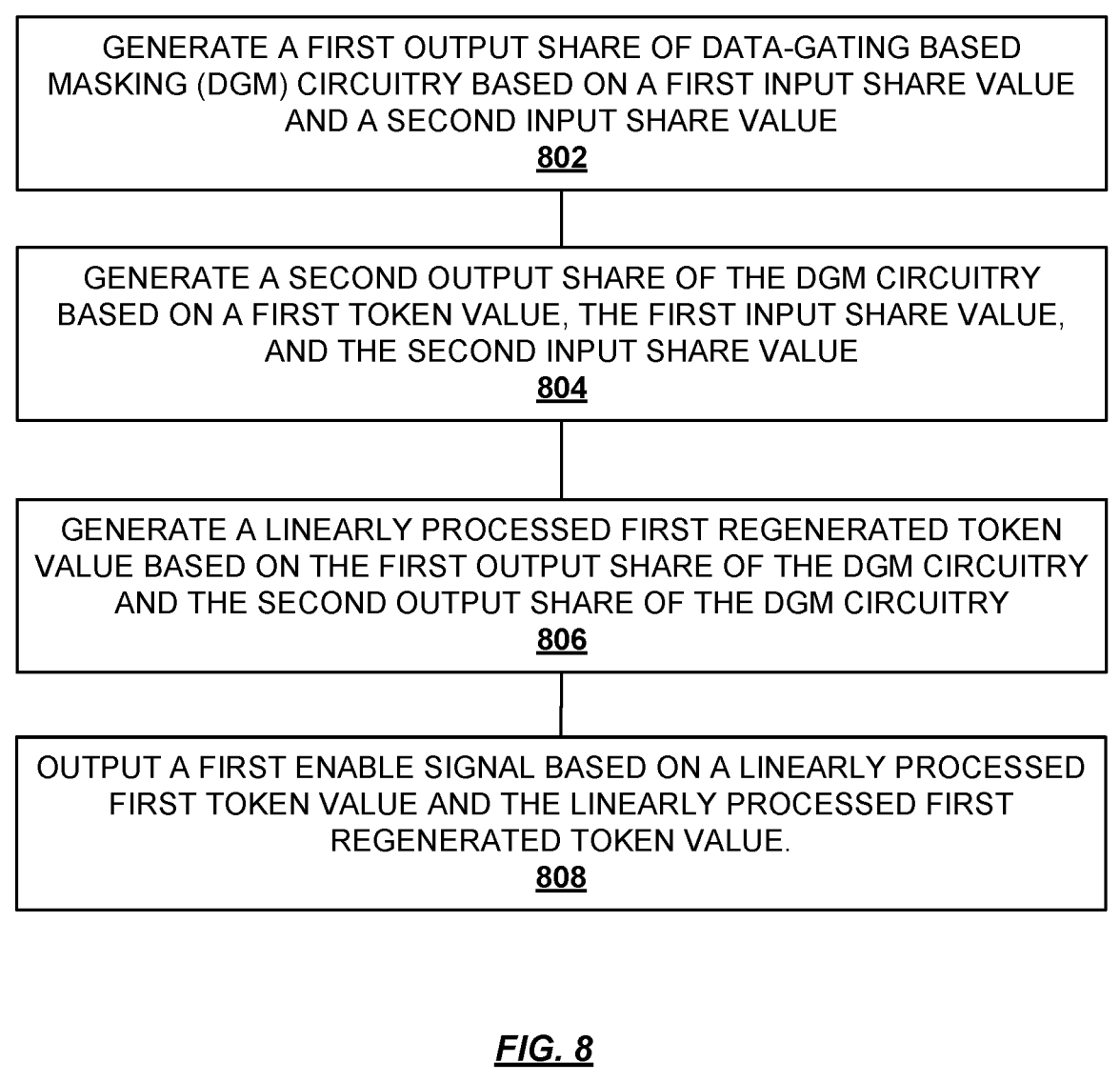

GENERATE A FIRST OUTPUT SHARE OF DATA-GATING BASED
MASKING (DGM) CIRCUITRY BASED ON A FIRST INPUT SHARE VALUE
AND A SECOND INPUT SHARE VALUE
802

GENERATE A SECOND OUTPUT SHARE OF THE DGM CIRCUITRY
BASED ON A FIRST TOKEN VALUE, THE FIRST INPUT SHARE VALUE,
AND THE SECOND INPUT SHARE VALUE
804

GENERATE A LINEARLY PROCESSED FIRST REGENERATED TOKEN
VALUE BASED ON THE FIRST OUTPUT SHARE OF THE DGM CIRCUITRY
AND THE SECOND OUTPUT SHARE OF THE DGM CIRCUITRY
806

OUTPUT A FIRST ENABLE SIGNAL BASED ON A LINEARLY PROCESSED
FIRST TOKEN VALUE AND THE LINEARLY PROCESSED FIRST
REGENERATED TOKEN VALUE.
808

*FIG. 8*

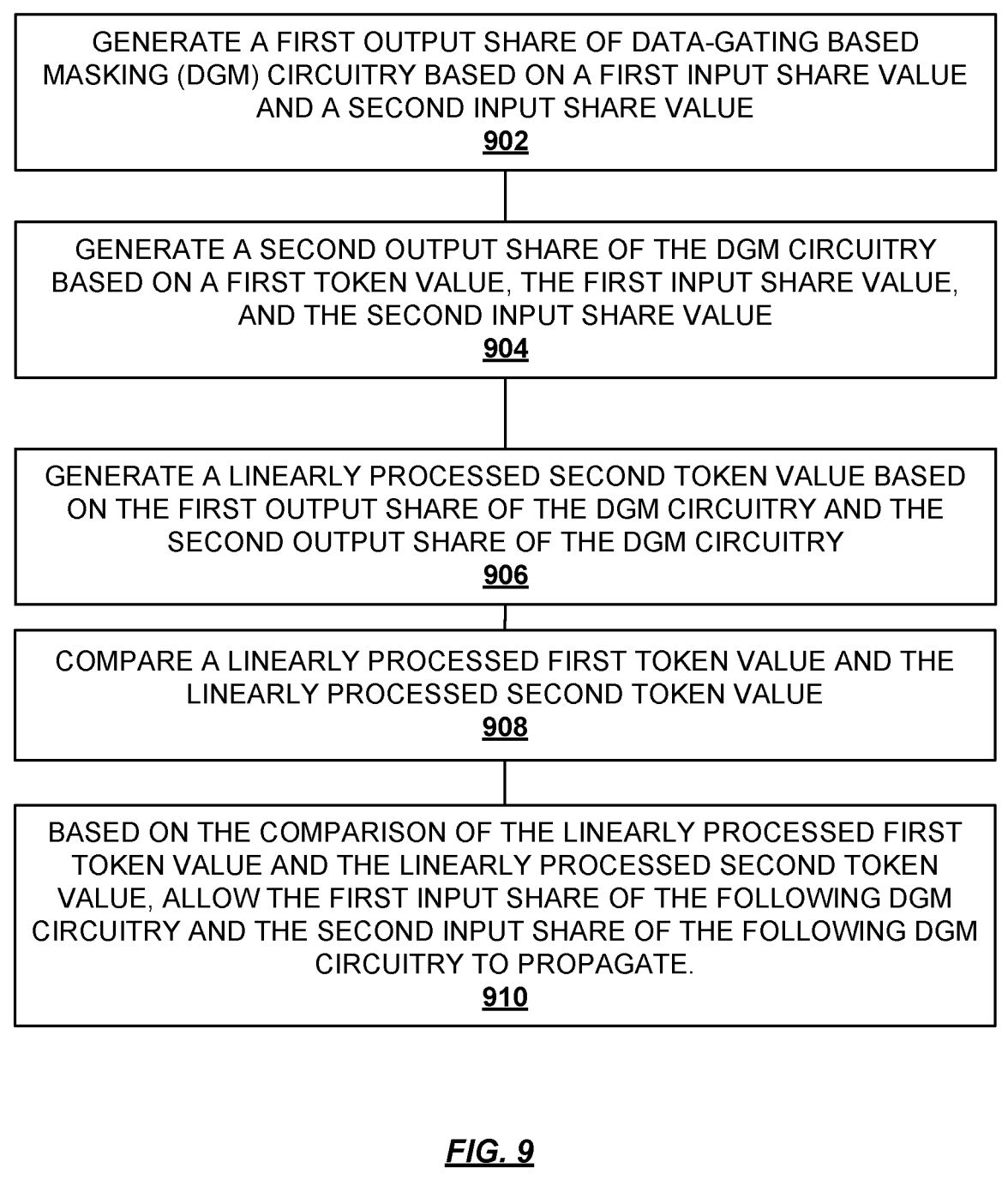

GENERATE A FIRST OUTPUT SHARE OF DATA-GATING BASED
MASKING (DGM) CIRCUITRY BASED ON A FIRST INPUT SHARE VALUE
AND A SECOND INPUT SHARE VALUE
902

GENERATE A SECOND OUTPUT SHARE OF THE DGM CIRCUITRY
BASED ON A FIRST TOKEN VALUE, THE FIRST INPUT SHARE VALUE,
AND THE SECOND INPUT SHARE VALUE
904

GENERATE A LINEARLY PROCESSED SECOND TOKEN VALUE BASED
ON THE FIRST OUTPUT SHARE OF THE DGM CIRCUITRY AND THE
SECOND OUTPUT SHARE OF THE DGM CIRCUITRY
906

COMPARE A LINEARLY PROCESSED FIRST TOKEN VALUE AND THE
LINEARLY PROCESSED SECOND TOKEN VALUE
908

BASED ON THE COMPARISON OF THE LINEARLY PROCESSED FIRST
TOKEN VALUE AND THE LINEARLY PROCESSED SECOND TOKEN
VALUE, ALLOW THE FIRST INPUT SHARE OF THE FOLLOWING DGM
CIRCUITRY AND THE SECOND INPUT SHARE OF THE FOLLOWING DGM
CIRCUITRY TO PROPAGATE.
910

*FIG. 9*

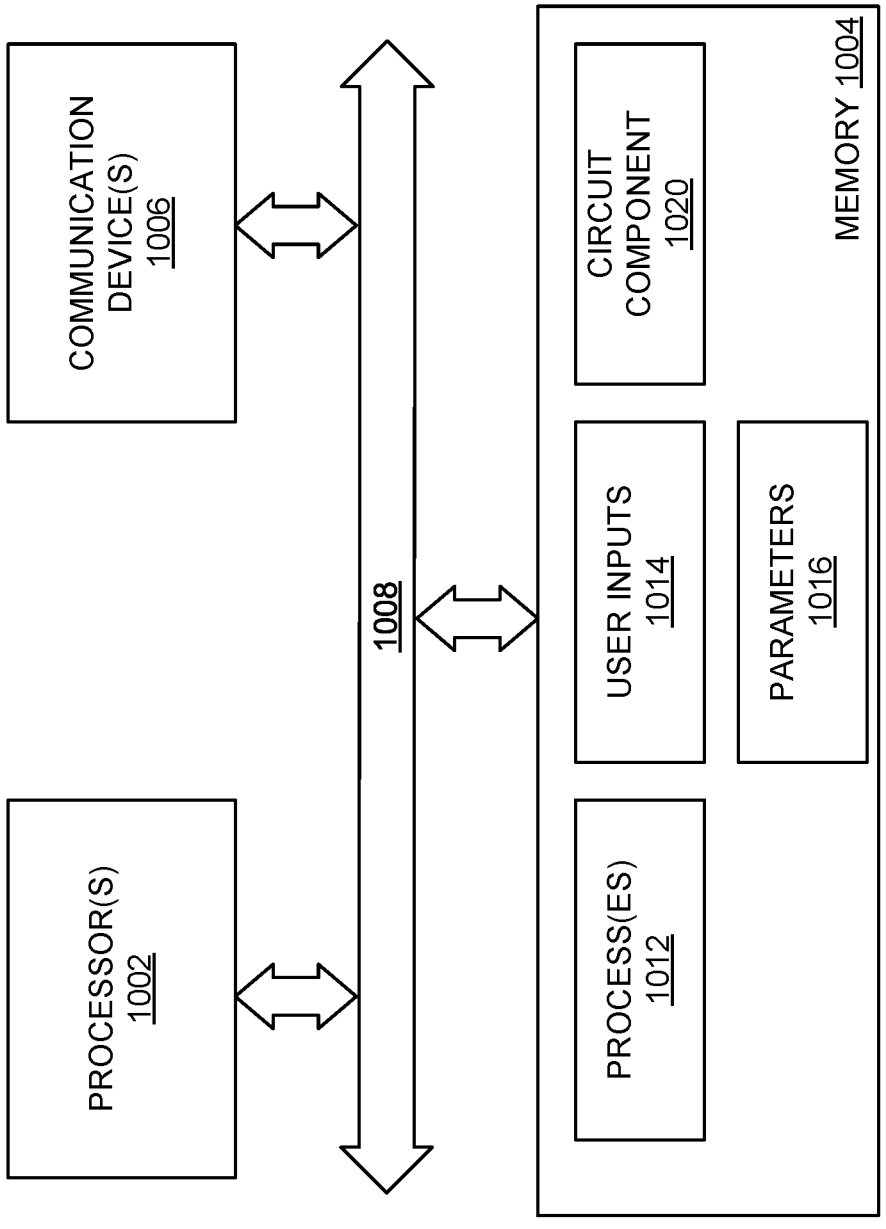
*FIG. 10*

DATA-GATING BASED MASKING

BRIEF DESCRIPTION OF THE DRAWINGS

FIGS. 2A-2B are a block diagrams illustrating examples of token compare based gating.

FIG. 3 is a block diagram illustrating completion detection based gating.

FIGS. 4A-4B are block diagrams illustrating examples of DGM-based AND circuitry with enable.

FIG. 8 is a flowchart illustrating a method of DGM using a synchronization token.

FIG. 9 is a flowchart illustrating a method of token compare based gating.

FIG. 10 is a block diagram of a processing system.

DETAILED DESCRIPTION OF THE EMBODIMENTS

Figure 1A:
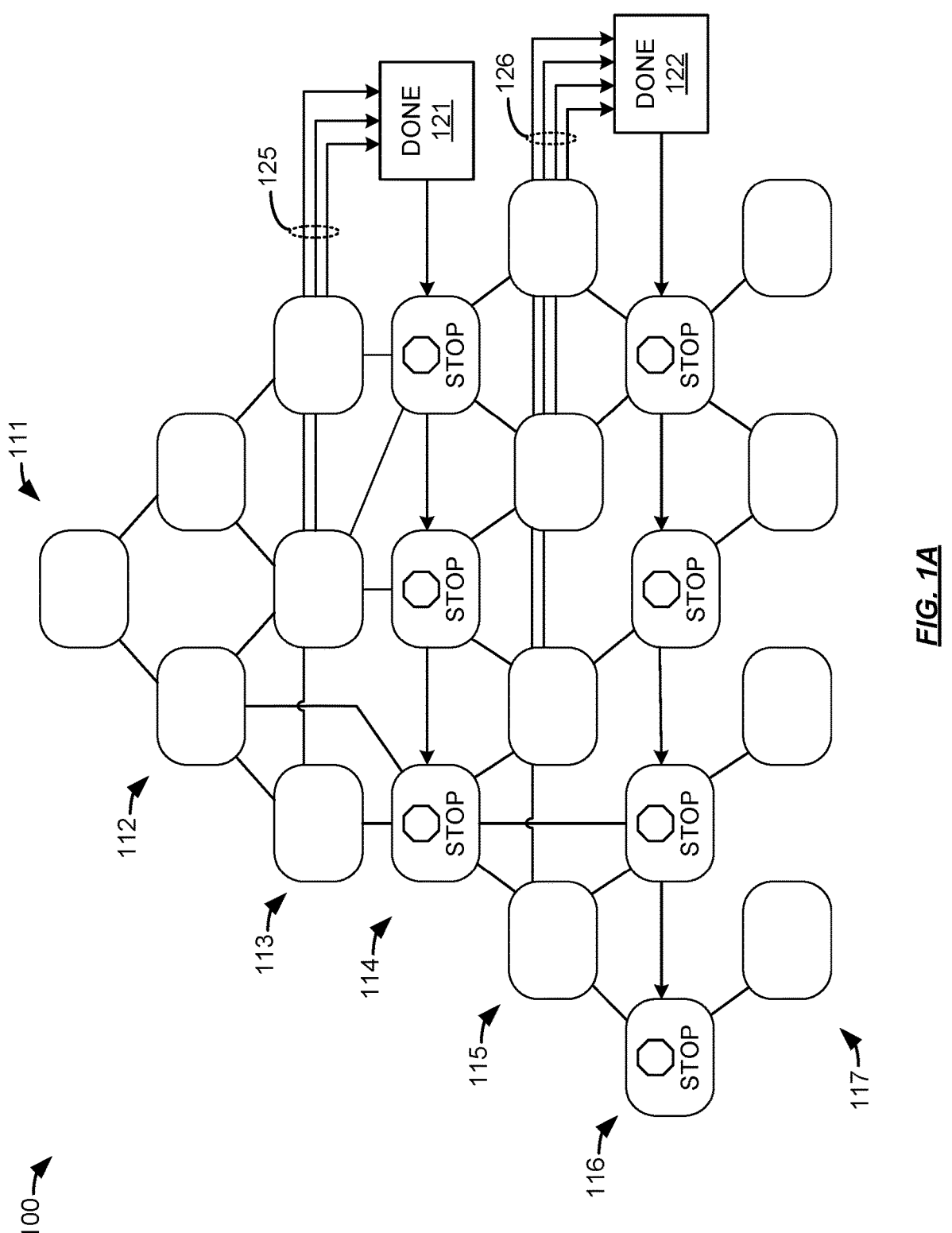
FIGS. 1A-1D illustrate data-gating based masking (DGM).

Hardware masking is a countermeasure that may be used to make power analysis attacks more difficult. Masking attempts to decouple the secret and/or processed values of a cryptographic implementation from its intermediate values. One method of masking is to probabilistically split each bit of a computation into multiple "shares". Because the values of the shares are the result of an operation that processes random values, each share bit does not yield information about the original bit. Computations may then be performed on the individual bit shares (a.k.a. mask shares) without revealing information about the original (secret) bit.

Dynamic hazards in the computation of share bits, however, can cause information leakage in the form of short unwanted spikes in the output of gates (a.k.a., glitches). In an embodiment, asynchronous gating elements are used to stop the propagation of glitches. The asynchronous gating elements (e.g., AND gates, asynchronous set-reset latches, and/or state-holding elements like the Muller C-element, etc.) stop the flow of data in a mask share until an asynchronous enable signal is received. The enable signal is a function of the output(s) of the combinatorial logic of a share that indicates the computation on the inputs of the share are complete.

In an embodiment, a bundled-data protocol can be used to synchronize the data flow in the mask shares. A random synchronization token is input and "bundled" with the combinatorial logic of a share. An additional output from the combinatorial logic is also provided such that when the original combinational output is exclusive OR'd (XOR'd) with the additional output yields the random synchronization token. When the XOR of the original and additional outputs, and the input synchronization token are equal, it indicates that the computation of the combinatorial logic is complete. Thus, the result of the comparison of the XOR of the original and additional outputs, and the input synchronization token may be used as a "done" or "enable" handshake signal to allow asynchronous gating elements (e.g., AND gates, asynchronous set-reset latches, and/or state-holding elements like the Muller C-element, etc.) to start and stop the flow of data in a mask share. Starting and stopping the flow of data in a mask share during the computations of the combinatorial logic helps stop the propagation of glitches through the asynchronous gating elements.

In an embodiment, a different synchronization or handshake protocol may be used. For example, multi-phase bundled protocols and/or dual-rail logic protocols may be used. The synchronization token may be random or fixed. The synchronization token may be encoded in at least 2 wires per bit of information. If at least one of the dual-rail wires makes a transition, it indicates that the computation of the combinatorial logic is complete. A "done" or "enable" handshake signal can be computed to allow asynchronous gating elements to start and stop the flow of data in a mask share.

In an embodiment, a state-holding element like a Muller C-element may be used as a synchronization or handshake protocol. The output of the Muller C-element is set to 0 in case all inputs are 0, and the output of the Muller C-element is set to 1 in case all inputs are set to 1. Multiple element may be used in a pipeline to indicate that the computation of the combinatorial logic is complete. A "done" or "enable" handshake signal can be computed to allow asynchronous gating elements to start and stop the flow of data in a mask share.

FIGS. 1A-1D illustrate the concepts of Data-gating Based Masking (DGM). In FIGS. 1A-1D, combinatorial logic 100 of a share is notionally illustrated by logic layers 111-117. In an embodiment, the elements of combinatorial logic 100 reside on an integrated circuit. Outputs of logic layer 111 are illustrated as operatively coupled to inputs of logic layer 112. Outputs of logic layer 112 are illustrated as operatively coupled to inputs of logic layer 113 and gating layer 114. Outputs of logic layer 113 are illustrated as operatively coupled to inputs of gating layer 114. Intermediate results 125 of logic layer 113 are also operatively coupled to completion detector 121. Outputs of gating layer 114 are illustrated as operatively coupled to inputs of logic layer 115 and gating layer 116. Gating layer 114 also receives an enable signal from completion detector 121. Outputs of logic layer 115 are illustrated as operatively coupled to inputs of gating layer 116. Outputs of logic layer 115 are also operatively coupled to completion detector 122. Outputs of gating layer 116 are illustrated as operatively coupled to inputs of layer 117.

Figure 1B:
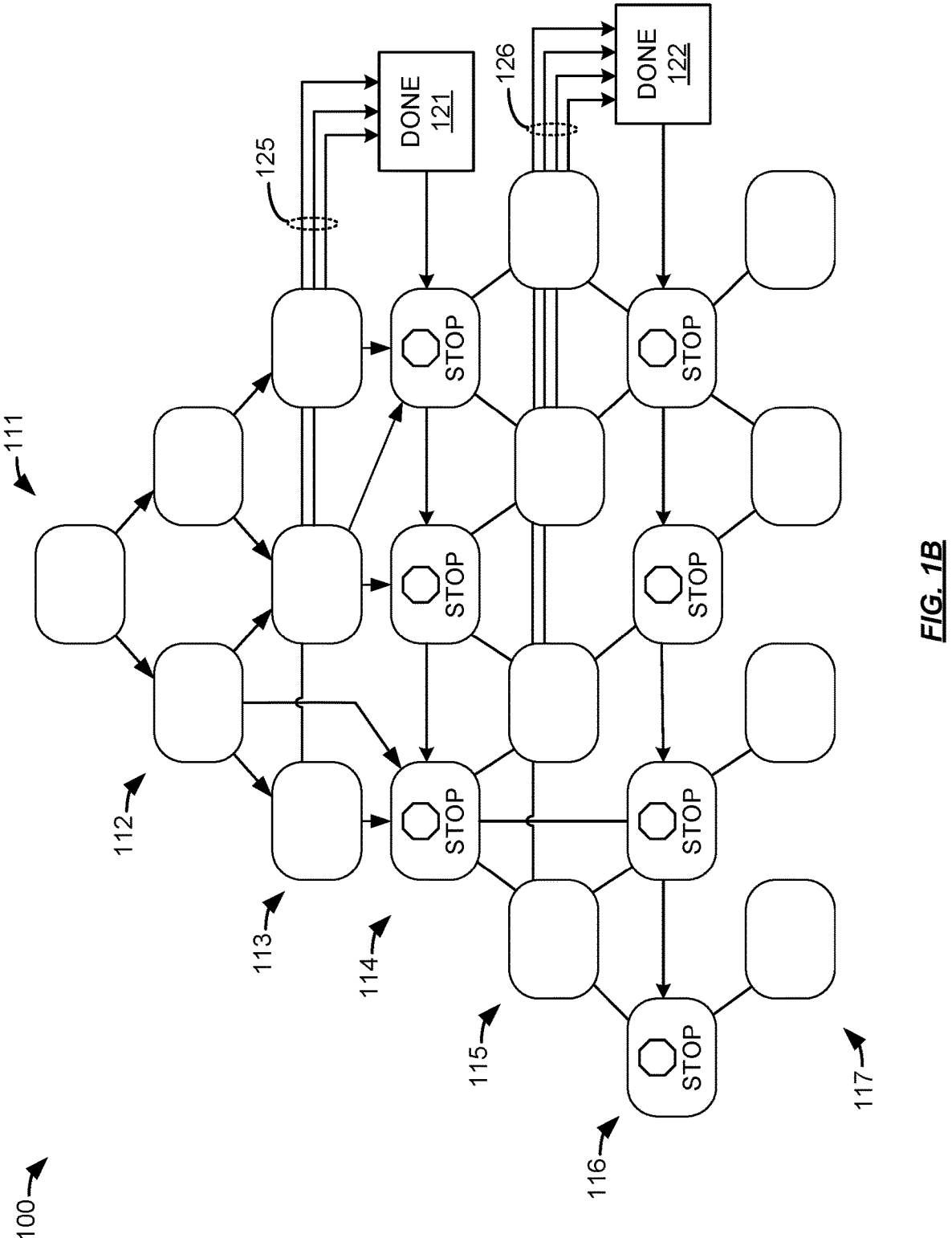

FIG. 1B illustrates a first gating of signals to reduce glitches. In FIG. 1B, an input to layer 111 has changed causing signals and glitches to propagate through logic layer 111, logic layer 112, and layer 133 to the inputs of gating layer 114. Using the intermediate results 125 from logic layer 113, completion detector 121 causes the gates of gating layer 114 to stop the propagation of signals and glitches from the inputs of gating layer 114 to the outputs of gating layer 114. This is illustrated in FIG. 1B by the arrows on the interconnections between layers 111-114 and the lack of arrows on the outputs of gating layer 114.

Figure 1C:
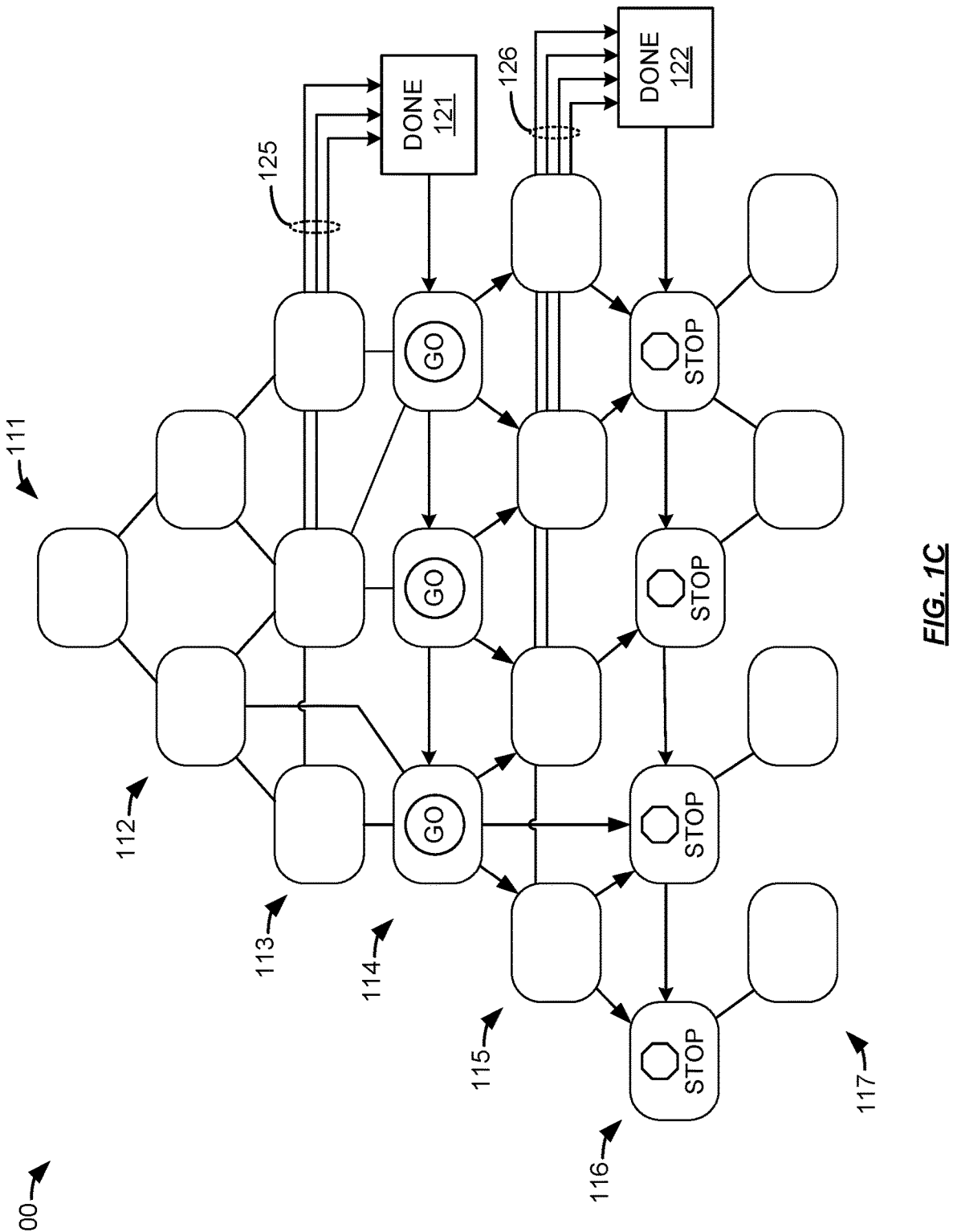

FIG. 1C illustrates a second gating to reduce glitches. In FIG. 1C, completion detector 121, based on intermediate results 125, has determined that the calculations by layers 111-113 are complete. Thus, completion detector 121 enables the gates of gating layer 114 to allow the propagation of signals from logic layer 113 though gating layer 114 to logic layer 115 and gating layer 116. This is illustrated in FIG. 1C by the arrows on the interconnections between layers 114-116 and the lack of arrows on the outputs of gating layer 116.

Figure 1D:
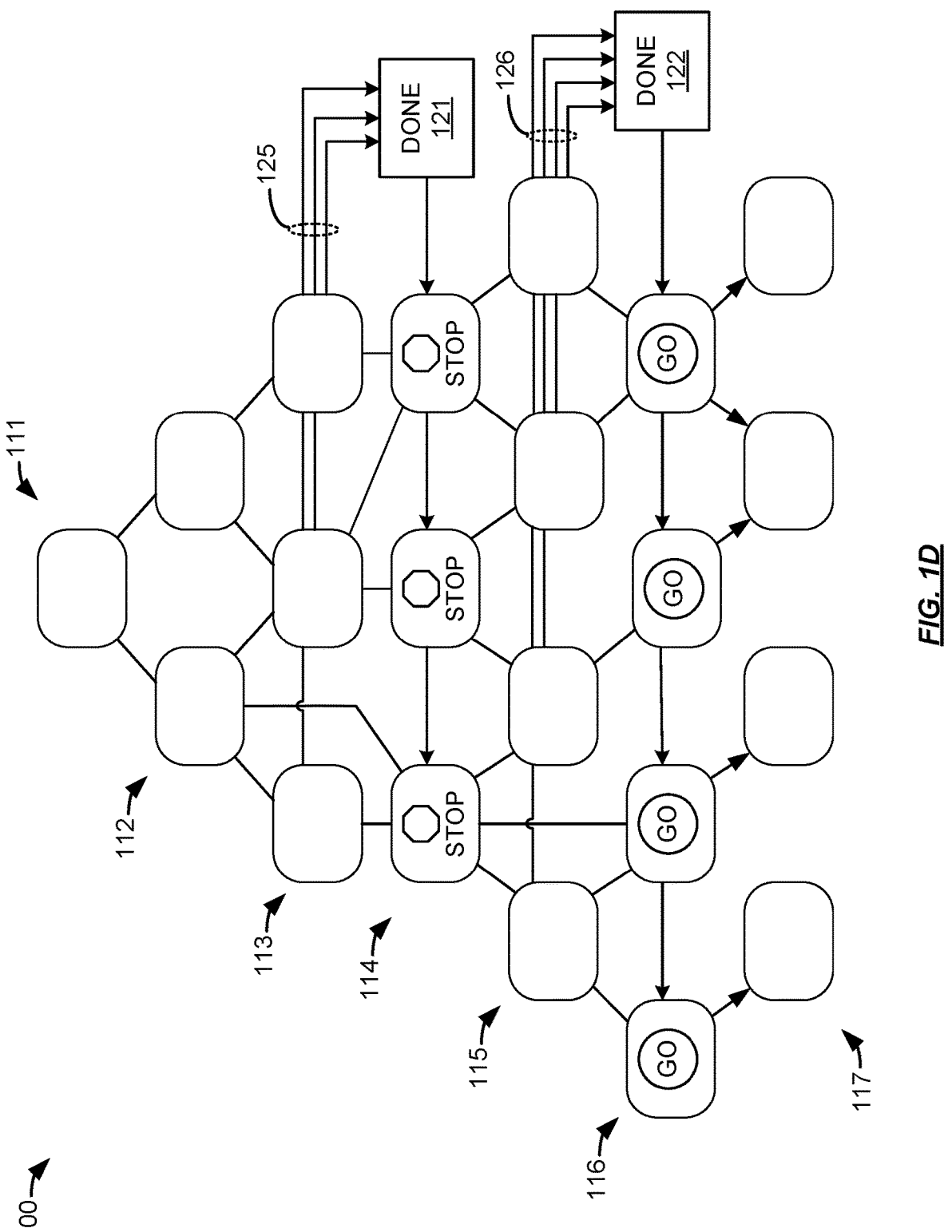

FIG. 1D illustrates the completion of the computations by combinatorial logic 100. In FIG. 1D, completion detector 122, based on intermediate results 126, has determined that the calculations by logic layer 115 is complete. Thus, completion detector 122 enables the gates of gating layer 116 to allows the propagation of signals from layer 115 though gating layer 116 to layer 117. This is illustrated in FIG. 1D by the arrows on the interconnections between gating layer 116 and layer 117.

Figure 2A:
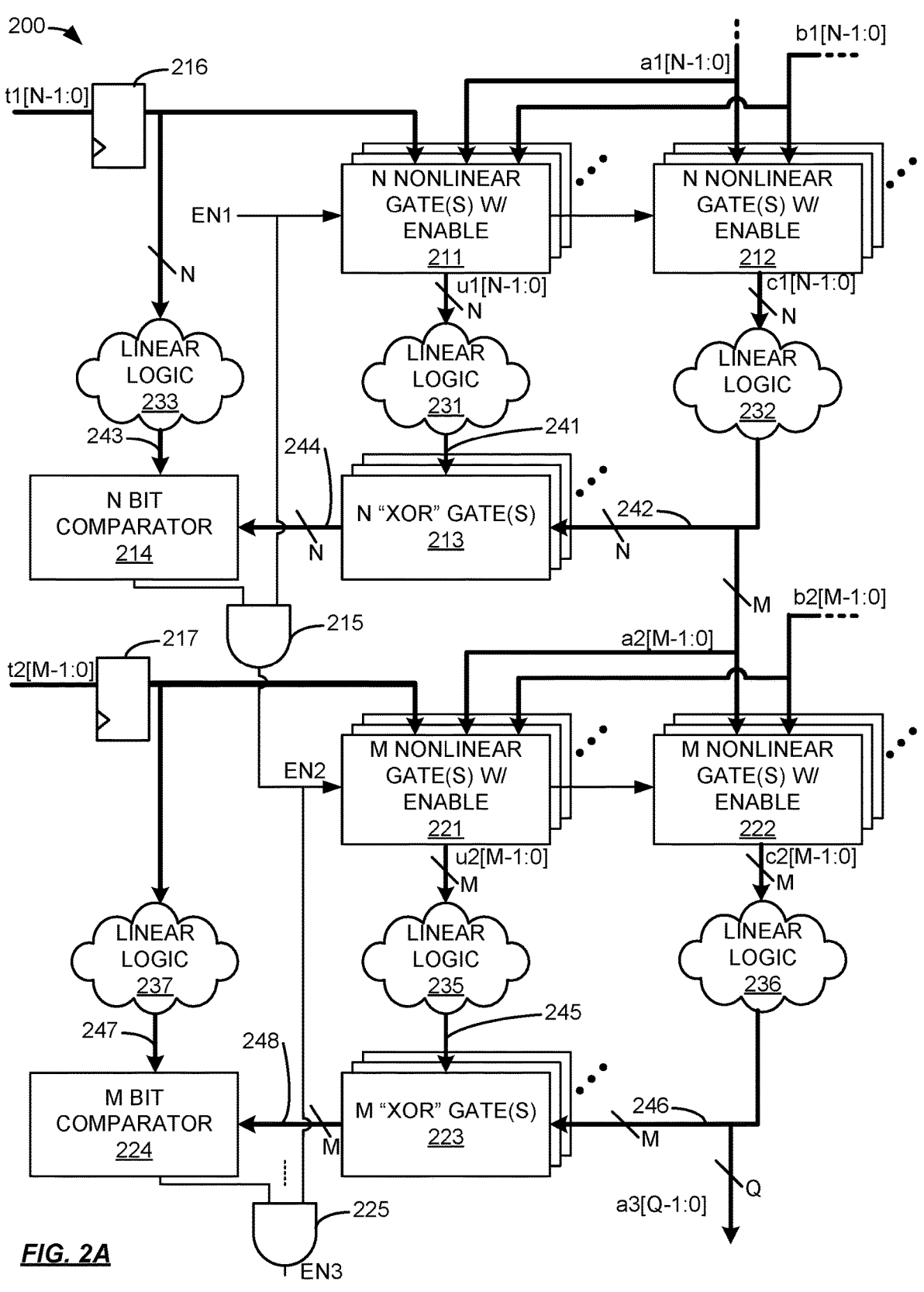

FIGS. 2A-2B are block diagrams illustrating examples of token compare based gating. In FIGS. 2A-2B, N, M, and Q are arbitrary integers greater than zero. In FIG. 2, system 200 comprises N number of nonlinear gates with enable inputs 211, N number of nonlinear gates with enable inputs 212, N number of exclusive-OR (XOR) gates 213, an N number of bits equality comparator 214, two input AND gate 215, linear logic 231, linear logic 232, linear logic 233, M number of nonlinear gates with enable inputs 221, M number of nonlinear gates with enable inputs 222, M number of XOR gates 223, an M number of bits equality comparator 224, two input AND gate 225, and linear logic 235, linear logic 236, and linear logic 237. In an embodiment, the elements of system 200 may reside on an integrated circuit.

Nonlinear gates 212 each receive a respective one of N number of input bits a1[N−1:0] and a respective one of N number of input bits b1[N−1:0]. Nonlinear gates 211 each receive a respective one of N number of input bits a1[N−1:0], a respective one of N number of input bits b1[N−1:0], and a respective one of latched (by latch 216) random token bits t1[N−1:0]. Nonlinear gates 211 and nonlinear gates 212 each receive an enable signal EN1. The N bits of output from nonlinear gates 212 c1[N−1:0] is operatively coupled to linear logic 232. The N bits of output from nonlinear gates 211 c1[N−1:0] is operatively coupled to linear logic 231. The N bits of latched token bits t1[N−1:0] are operatively coupled to linear logic 233.

The N bits of output 241 from linear logic 231 is operatively coupled respective ones of XOR gates 213. The N bits of output 242 from linear logic 232 is operatively coupled respective ones of XOR gates 213. The N bits of output 244 from XOR gates 213 is operatively coupled to a first input of comparator 214. The N bits of output 243 from linear logic 233 is operatively coupled a second input of comparator 214. AND gate 215 receives the output of comparator 214 and the enable signal EN1.

Linear logic 232 produces an M bit value a2[M−1:0]. Another M bit value b2[M−1:0] is received from other logic not shown in FIGS. 2A-2B. Respective ones of nonlinear gates 222 receive respective ones of a2[M−1:0] and b2[M−1:0]. Along with a respective ones of latched (by latch 217) random token bits t2[N−1:0], nonlinear gates 221 each receive respective ones of a2[M−1:0] and b2[M−1:0]. Nonlinear gates 221 and nonlinear gates 222 each receive an enable signal EN2 from AND gate 215.

The M bits of output from nonlinear gates 221 u2[M−1:0] is operatively coupled to linear logic 235. The M bits of output from nonlinear gates 222 c2[M−1:0] is operatively coupled to linear logic 236. The N bits of latched (by latch 217) token bits t1[N−1:0] are operatively coupled to linear logic 237.

The M bits of output 245 from linear logic 235 is operatively coupled respective ones of XOR gates 223. The M bits of output 246 from linear logic 236 is operatively coupled respective ones of XOR gates 223. The M bits of output 248 from XOR gates 223 is operatively coupled to a first input of comparator 224. A second input of comparator 224 receives M bits of output 247 from linear logic 237.

AND gate 225 receives the output of comparator 224 and the enable signal EN2. Linear logic 236 produces Q bit values a3[Q−1:0].

In an embodiment, the outputs of nonlinear gates 211 and nonlinear gates 212 do not change (i.e., propagate values or glitch) when not enabled by enable signal EN1. Thus, changes in value and glitches on the a1[N−1:0] and b1[N−1:0] signals do not affect linear logic 231 or XOR gates 213 when enable signal EN1 is disabling nonlinear gates 211 and nonlinear gates 212. Nonlinear gates 211 and nonlinear gates 212 may be, for example, secure (i.e., masked) implementations of AND gates, NAND gates, OR gates, NOR gates, latches, multiplexors, and/or transmission (a.k.a., transfer) gates. It should be understood that nonlinear gates, such as secure implementations of AND, NAND, OR, NOR, or multiplexor etc. combine both mask shares, and therefore need "synchronization". Linear logic 231-233 235-237 use linear operations like XORs. This allows computation on single mask shares without the need to combine both mask shares. Thus, no synchronization is needed for linear logic 231-233 235-237. However, linear logic 231-233 235-237 needs to be computed for both shares and also for the synchronization token in order for a match comparators 214 and 224 to signal a match.

Nonlinear gates 211 implement first function ($f_{211}$). Nonlinear gates 212 implement a second function ($f_{212}$). The first function $f_{211}$ and the second function $f_{212}$ are related such that bitwise XORing the output of the first function u1[N−1:0] with the output of the second function c1[N−1] results in the random token value t1[N−1:0]. In other words: $f_{211}$(a1, b1, t1)$\oplus f_{212}$(a1, b1)=u1[N−1:0]$\oplus$c1[N−1:0]=t1[N−1:0] when the outputs of linear logic 231-233 have stabilized. Thus, when the outputs of XOR gates 213 equals t1[N−1:0], it is an indication that the inputs to the non-linear gates 221 and 222 have been processed and have been stabilized. Accordingly, system 200 uses the output of comparator 214 to enable a next stage of processing by nonlinear gates 221 and nonlinear gates 222.

Like nonlinear gates 211 and nonlinear gates 212, the outputs of nonlinear gates 221 and nonlinear gates 222 do not change (i.e., propagate values or glitch) when not enabled by enable signal EN2 from AND gate 215. Thus, changes in value and glitches on the a2[M−1:0] and b2[M−1:0] signals do not affect linear logic 235 or linear logic 236 when enable signal EN2 is disabling nonlinear gates 221 and nonlinear gates 222. Nonlinear gates 221 and nonlinear gates 222 may be, for example, secure (i.e., masked) implementations of AND gates, NAND gates, OR gates, NOR gates, latches, multiplexors, and/or transmission (a.k.a., transfer) gates.

Nonlinear gates 221 implement first function ($f_{221}$). Nonlinear gates 222 implement a second function ($f_{222}$). The first function $f_{221}$ and the second function $f_{222}$ are related such that bitwise XORing the output of the first function u2[M−1:0] with the output of the second function c2[M−1] results in the random token value t2[M−1:0]. In other words: $f_{221}$(a2, b2, t2)$\oplus f_{212}$(a2, b2)=u2[M−1:0]$\oplus$c2[M−1:0]=t2[M−1:0] when the outputs of linear logic 235-237 have stabilized. Thus, when the outputs of XOR gates 223 equals t2[M−1:0], it is an indication that the inputs to the nonlinear gates of the next stage have been processed and have been stabilized. Accordingly, system 200 uses the output of comparator 224 to enable a next stage of processing by nonlinear gates.

FIG. 2B is an illustration of another example of token compare based gating. FIG. 2B is similar to FIG. 2A except that latches 218a and 219a latch the token values t1[N−1:0]

and t2[M−1:0], respectively and latches 218*b* and 219*b* latch the output of linear logic 233 and 237, respectively. Therefore, for system 201 illustrated in FIG. 2B, the input to the comparators 214 and 224 are "pre-computed." This helps ensure that this input to the comparators 214 and 224 are "glitch-free". Because the operation of the rest of system 201 is the same as the operation of system 201, further discussion of system 201 will be omitted, for the sake of brevity.

FIG. 3 is a block diagram illustrating completion detection based gating. In FIG. 3, system 300 comprises data gate 311, completion detector 314, data gate 321, completion detector 324, combinatorial logic 326, data gate 331, completion detector 334, and combinatorial logic 336. In an embodiment, the elements of system 300 may reside on an integrated circuit.

Completion detector 314 is operatively coupled to data gate 311 to enable and disable data gate 311 from propagating signals and/or glitches. The output of data gate 311 is operatively coupled to inputs of combinatorial logic 326. One or more outputs of combinatorial logic 326 is operatively coupled to inputs of data gate 321. The outputs of combinatorial logic or other intermediate signals generated by combinatorial logic 326 are received by completion detector 324.

Completion detector 324 is operatively coupled to data gate 321. Completion detector 324 is operatively coupled to data gate 321 to enable and disable data gate 321 from propagating signals and/or glitches. The output of data gate 321 is operatively coupled to inputs of combinatorial logic 336. One or more outputs of combinatorial logic 336 is operatively coupled to inputs of data gate 331. The outputs of combinatorial logic or other intermediate signals generated by combinatorial logic 336 are received by completion detector 334.

Completion detector 334 is operatively coupled to data gate 331. Completion detector 334 is operatively coupled to data gate 331 to enable and disable data gate 331 from propagating signals and/or glitches.

In FIG. 3, completion detector 314 optionally receives an enable signal 315 from a completion detector of a previous stage. Completion detector 314 generates an enable signal (EN1) that is provided to data gate 311. The output(s) of data gate 311 do not change (i.e., propagate values or glitches) when not enabled by enable signal EN1. Thus, changes in value and glitches on the input signals to data gate 311 do not affect combinatorial logic 326 when data gate 311 is not enabled. When completion detector 314 enables data gate 311, the values on the inputs to data gate 311 are allowed to propagate to (and through) combinatorial logic 326.

Completion detector 324 optionally receives an enable signal 325 from a completion detector 314. Completion detector 324 generates an enable signal (EN2) that is provided to data gate 321. The output(s) of data gate 321 do not change (i.e., propagate values or glitches) when not enabled by enable signal EN2. Thus, changes in value and glitches on the outputs of combinatorial logic 326, which are input to data gate 321, do not affect combinatorial logic 336 when data gate 321 is not enabled.

Completion detector 324 receives intermediate values or output values from combinatorial logic 326. Based on these intermediate or output values from combinatorial logic 326, completion detector determines when to enable data gate 321. For example, when certain outputs of combinatorial logic 326 equal a selected value, it may indicate that combinatorial logic 326 is done processing the values on the inputs to combinatorial logic 326. When completion detector 314 enables data gate 321, the values on the inputs to data gate 321 are allowed to propagate to (and through) combinatorial logic 336.

Completion detector 334 optionally receives an enable signal 335 from completion detector 324. Completion detector 334 generates an enable signal (EN3) that is provided to data gate 331. The output(s) of data gate 331 do not change (i.e., propagate values or glitches) when not enabled by enable signal EN3. Thus, changes in value and glitches on the outputs of combinatorial logic 336, which are input to data gate 331, do not affect combinatorial logic of subsequent stages when data gate 331 is not enabled.

Completion detector 334 receives intermediate values or output values from combinatorial logic 336. Based on these intermediate or output values from combinatorial logic 336, completion detector determines when to enable data gate 331. For example, when certain outputs of combinatorial logic 336 equal a selected value, it may indicate that combinatorial logic 336 is done processing the values on the inputs to combinatorial logic 336. When completion detector 334 enables data gate 331, the values on the inputs to data gate 331 are allowed to propagate to a subsequent stage.

Figure 4A:
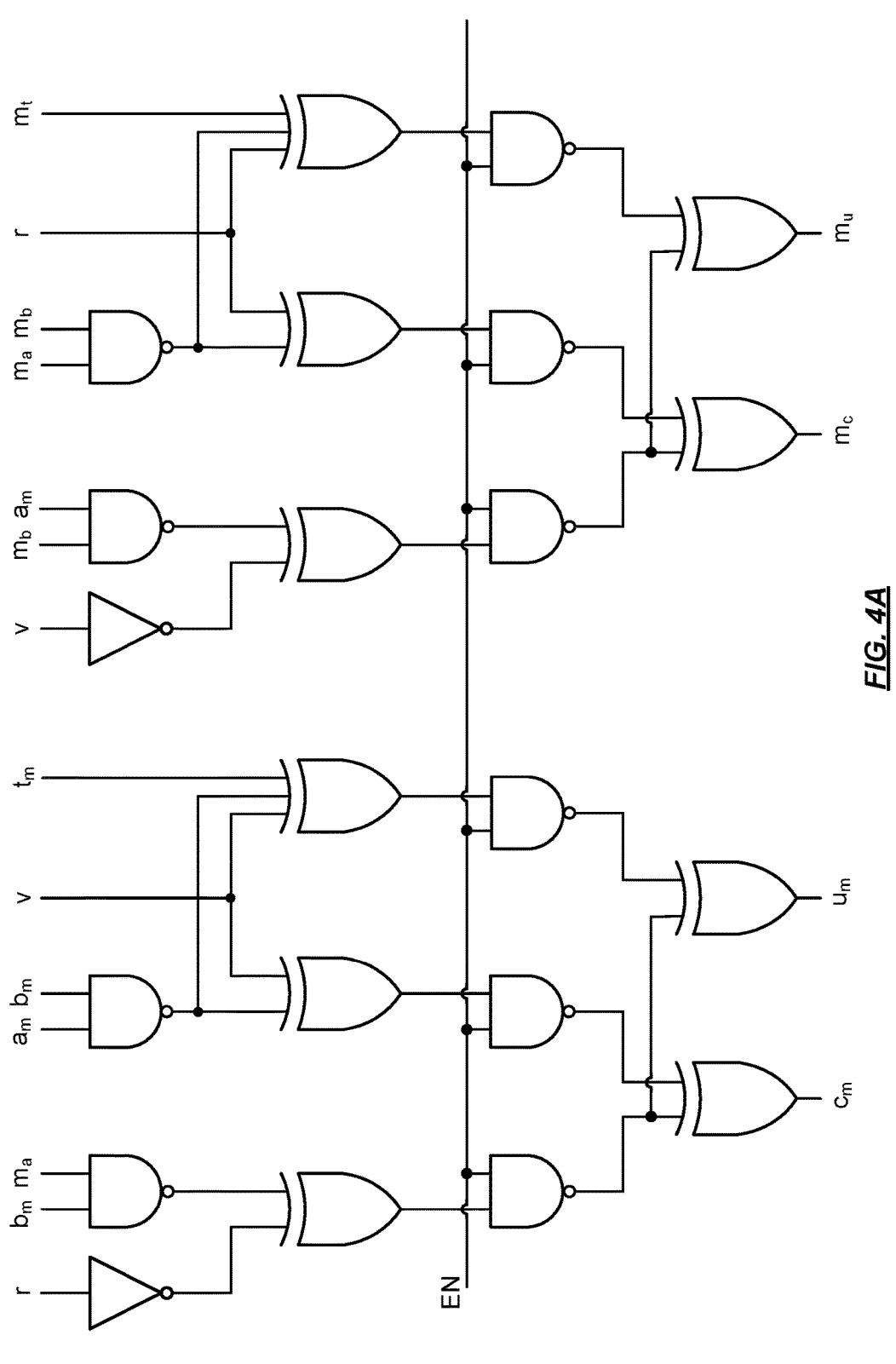

FIGS. 4A-4B are block diagrams illustrating examples of DGM-based AND circuitry with enable(s). The DGM AND gates illustrated in FIGS. 4A-4B may be used as, and/or in, for example, gating layer 114, gating layer 116, non-linear gates 211-212, non-linear gates 221-222, data gate 311, data gate 321, and/or data gate 331. In an embodiment, the elements of DGM based AND circuitry 400 and 401 may reside on an integrated circuit.

In FIG. 4A, an example of a DGM based AND circuitry 400 generates a masked AND function across two shares. AND circuitry 400 generates a masked AND function between two input variables (a, b) where each variable is represented as two Boolean masked shares ($a_m$, $m_a$) and ($b_m$, $m_b$). The function outputs the result c=a&b whereas the c is securely represented as two Boolean masked shares ($c_m$, $m_c$). The function further outputs two separate variables $u_m$ and $m_u$ which are used for re-generating the random tokens $t_m$ and $m_t$. Each random token $t_m$ and $m_t$ are dedicated to respective output shares, where $t_m=c_m\oplus u_m$ and $m_t=m_c\oplus m_u$. The first output share of DGM based AND circuitry 400 receives an enable signal EN and the masked share values $a_m$, $b_m$, $m_a$ where $a=a_m\oplus m_a$ and $b=b_m\oplus m_b$. The first share also receives random token value $t_m$. The first output share of the DGM based AND circuitry 400 also uses the random values r and v. The first share produces masked output values $c_m$ and $u_m$. In this example. the first share produces $c_m$ and $u_m$ according to the following logic formula:

$$c_m=\overline{(((a_m\&b_m)\oplus v)\&EN)}\oplus\overline{((r\oplus(m_a\&b_m))\&EN)}$$

$$u_m=\overline{(((a_m\&b_m)\oplus v\oplus t_m)\&EN)}\oplus\overline{((r\oplus(m_a\&b_m))\&EN)}$$

The second output share of DGM based AND circuitry 400 receives an enable signal EN and the masked share values $a_m$, $m_a$, and $m_b$. The second output share of DGM based AND circuitry 400 also receives random token value $m_t$. The second output share of DGM based AND circuitry 400 also receives random values r and v. The second output share produces masked output values $m_c$ and $m_u$. The second output share produces $m_c$ and $m_u$ according to the following logic formula:

$$m_c=\overline{(((m_a\&m_b)\oplus r)\&EN)}\oplus\overline{((v\oplus(m_b\&a_m))\&EN)}$$

$$m_u=\overline{(((m_a\&m_b)\oplus r)\&EN)}\oplus\overline{((v\oplus(m_b\&a_m))\&EN)}$$

It should be understood that the output share $c_m$ and $m_c$ result in the correct computation of the AND function (a&b) when EN is set to a "1". In other words:

$$a\,\&b = c_m \oplus m_c = \overline{\left(\overline{\left(\left(a_m\,\&b_m\right)\oplus v\right)\,\&1}\right)} \oplus$$

$$\overline{\left(\left(\overline{r\oplus\overline{(m_a\,\&b_m)}}\right)\&1\right)} \oplus \overline{\left(\overline{\left(\left(m_a\,\&m_b\right)\oplus r\right)}\&1\right)} \oplus \overline{\left(\overline{v\oplus\overline{(m_b\,\&a_m)}}\right)\&1} =$$

$$\overline{\left(\overline{(a_m\,\&b_m)}\oplus v\right)} \oplus \overline{\left(\overline{r\oplus\overline{(m_a\,\&b_m)}}\right)} \oplus \overline{\left(\overline{(m_a\,\&m_b)}\oplus r\right)} \oplus \overline{\left(\overline{v\oplus\overline{(m_b\,\&a_m)}}\right)} =$$

$$\left(a_m\,\&b_m\right) \oplus \left(m_a\,\&b_m\right) \oplus \left(m_a\,\&m_b\right) \oplus \left(m_b\,\&a_m\right).$$

In FIG. 4B, an example of a DGM based AND circuitry 401 generates a masked AND function across two shares. AND circuitry 400 generates a masked AND function between two input variables (a, b) where each variable is represented as two Boolean masked shares ($a_m$, $m_a$) and ($b_m$, $m_b$). The function outputs the result c=a&b whereas the c is securely represented as four Boolean masked shares ($s_1$, $c_{ms}$, $s_2$, $m_{cs}$), where $c_m = s_1 \oplus c_{ms}$ and $m_c = s_2 \oplus m_{cs}$. The function further outputs two separate variables $u_m$ and $m_u$ which are used for re-generating the random tokens $t_m$ and $m_r$. Each random token $t_m$ and $m_r$ are dedicated to respective output shares, where $t_m = c_{ms} \oplus u_{ms}$ and $m_r = m_{cs} \oplus m_{us}$. The first output share of DGM based AND circuitry 401 receives two enable signals EN1 and EN2, and the masked share values $a_m$, $b_m$, $m_a$, where $a = a_m \oplus m_a$ and $b = b_m \oplus m_b$. The first share also receives random token value $t_m$. The first output share of the DGM based AND circuitry 401 also uses the random values r and v. The first share produces masked output values $s_1$, $c_{ms}$, and $u_{ms}$. In this example, the first share produces $s_1$, $c_{ms}$, and $u_{ms}$ according to the following logic formula:

$$c_{ms} = \overline{\left(\left(\left(a_m\&b_m\right)\oplus v\right)\&EN1\right)}$$

$$u_{ms} = \overline{\left(\left(\left(a_m\&b_m\right)\oplus v\oplus t_m\right)\&EN1\right)}$$

$$s_1 = \overline{\left(\left(r\oplus\left(m_a\&b_m\right)\right)\&EN2\right)}$$

The second output share of DGM based AND circuitry 401 receives the two enable signals EN1 and EN2, and the masked share values $a_m$, $m_a$, and $m_b$. The second output share of DGM based AND circuitry 401 also receives random token value $m_r$. The second output share of DGM based AND circuitry 401 also receives random values r and v. The second output share produces masked output values $s_2$, $m_{cs}$ and $m_{us}$. The second output share produces $s_2$, $m_{cs}$ and $m_{us}$ according to the following logic formula:

$$m_{cs} = \overline{\left(\left(\left(m_a\&m_b\right)\oplus r\right)\&EN1\right)}$$

$$m_{us} = \overline{\left(\left(\left(m_a\&m_b\right)\oplus r\oplus m_r\right)\&EN1\right)}$$

$$s_2 = \overline{\left(\left(v\oplus\left(m_a\&a_m\right)\right)\&EN2\right)}$$

It should be understood that DGM based AND circuitry 401 is essentially the same as DGM base AND circuitry 400 except the last XOR operation is not performed. Thus, DGM based AND circuitry 401 produces six output signals instead of four. In order to get the same result as DGM based AND circuitry 400, the output signals of DGM based AND circuitry 401 need to be combined. In other words:

$$c_m = c_{ms} \oplus s_1$$

$$u_m = u_{ms} \oplus s_1$$

$$m_c = m_{cs} \oplus s_2$$

$$m_u = m_{us} \oplus s_2.$$

However, in an embodiment, these XOR operations may be performed after linear logic (e.g., linear logic 231-233 and/or linear logic 233-237 of FIG. 2) and/or after combinatorial logic (See, e.g., combinatorial logic 761a-763a 761b-763b of FIG. 7) and/or within (e.g., as part of) any nonlinear DGM logic circuitry (e.g., AND circuitry 400 and/or AND circuitry 401).

It should also be understood that DGM based AND circuitry 400 and DGM based AND circuitry 401 are intended to be non-limiting examples. Other DGM based variants are contemplated. For example, variants of this DGM based AND circuitry that provides any number more than two (e.g., eight) output shares are contemplated. Similarly, DGM based AND circuitry that receives any number more than two (e.g., eight) input shares are contemplated.

Figure 5:
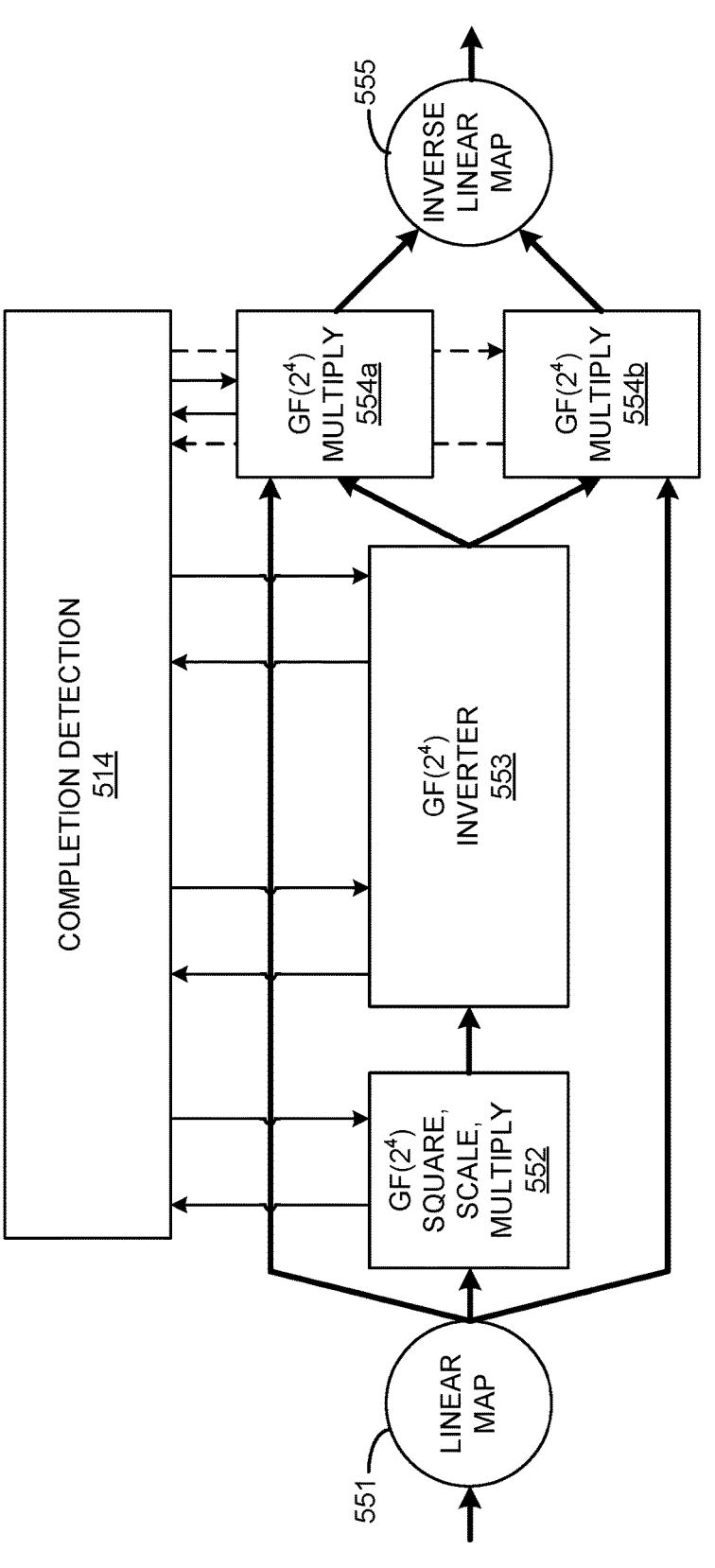
FIG. 5 is a block diagram illustrating an application of DGM applied on the Advanced Encryption Standard (AES) S-box.

FIG. 5 is a block diagram illustrating an application of DGM applied on the Advanced Encryption Standard (AES) S-box. In FIG. 5, system 500 comprises completion detection 514, linear map 551, $GF(2^4)$ square, scale, and multiply 552, $GF(2^4)$ inverter 553, first $GF(2^4)$ multiply 554a, second $GF(2^4)$ multiply 554b, inverse linear map 555, and completion detection 514. In an embodiment, the elements of system 500 may reside on an integrated circuit.

Completion detection 514 is operatively coupled to all non-linear elements in the S-box. For example, completion detection 514 is operatively coupled to the $GF(2^4)$ square, scale, and multiply logic 552, $GF(2^4)$ inverter 553, first $GF(2^4)$ multiply 554a, second $GF(2^4)$ multiply 554b. Completion detection 514 is operatively coupled to $GF(2^4)$ square, scale, and multiply 552, $GF(2^4)$ inverter 553, first $GF(2^4)$ multiply 554a, second $GF(2^4)$ multiply 554b at certain stages to stop the propagation of signals and glitches during the computations performed by $GF(2^4)$ square, scale, and multiply 552, $GF(2^4)$ inverter 553, first $GF(2^4)$ multiply 554a, second $GF(2^4)$ multiply 554b. In particular, completion detection 514 is operatively coupled to $GF(2^4)$ square, scale, and multiply 552, $GF(2^4)$ inverter 553, first $GF(2^4)$ multiply 554a, second $GF(2^4)$ multiply 554b at stages where a non-linear operation (e.g., AND logic) is being performed. Thus, for example, the AND gate with enable illustrated in FIG. 4 may be used in $GF(2^4)$ square, scale, and multiply 552, $GF(2^4)$ inverter 553, first $GF(2^4)$ multiply 554a, second $GF(2^4)$ multiply 554b and controlled by completion detection 514 to stop the propagation of data and glitches.

The input to system 500 is received by linear map 551. The output of linear map 551 is provided to $GF(2^4)$ square, scale, and multiply 552, first $GF(2^4)$ multiply 554a, and second $GF(2^4)$ multiply 554b. The output of $GF(2^4)$ square, scale, and multiply 552 is provided to $GF(2^4)$ inverter 553. The output of $GF(2^4)$ inverter 553 is provided to first $GF(2^4)$ multiply 554a, and second $GF(2^4)$ multiply 554b. The outputs of first $GF(2^4)$ multiply 554a, and second $GF(2^4)$ multiply 554b are provided to inverse linear map 555. The output of inverse linear map 555 is the output of system 500.

Figure 6:
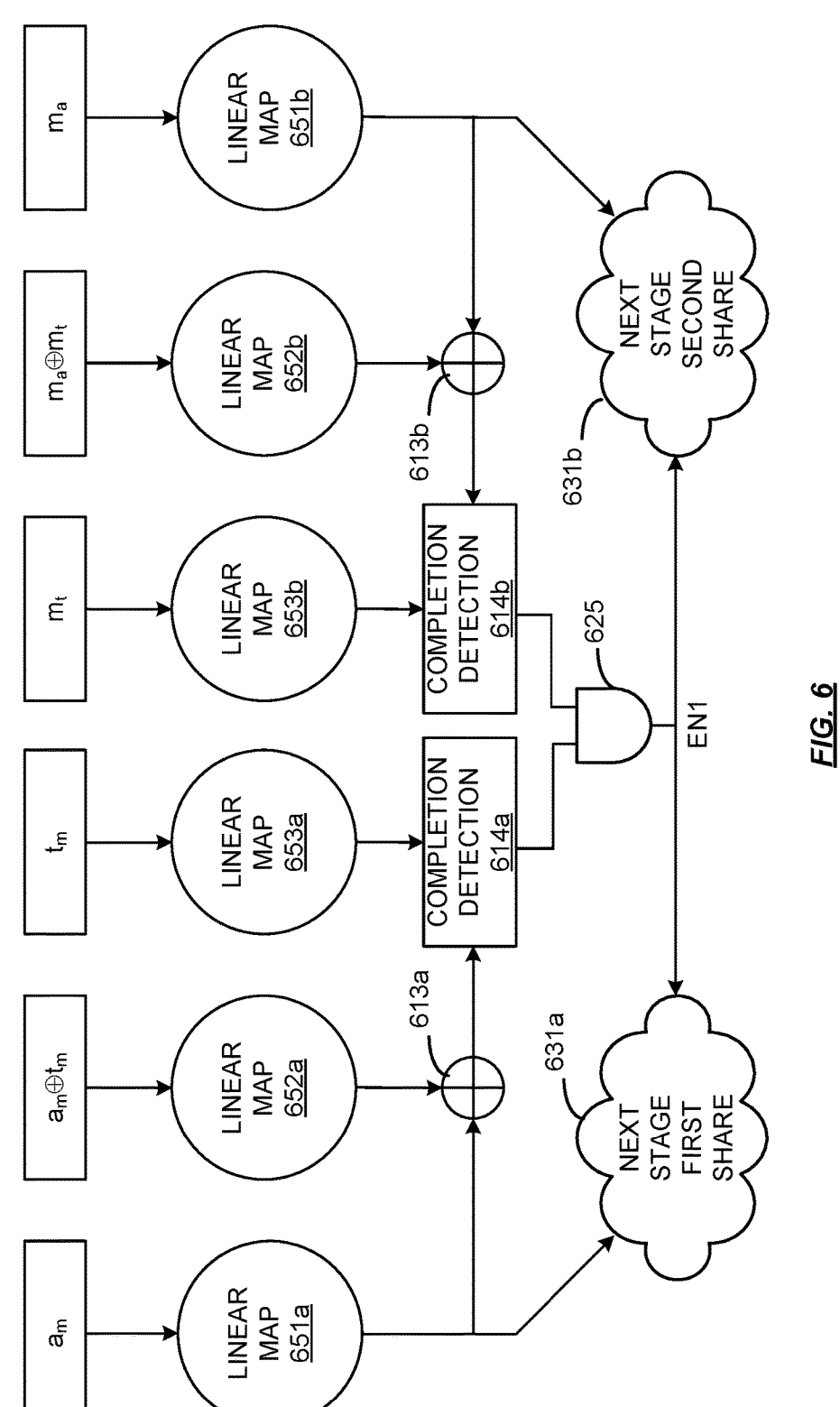
FIG. 6 is a block diagram illustrating a first stage of a DGM based AES S-box.

FIG. 6 is a block diagram illustrating a first stage of a DGM based AES S-box. In FIG. 6, system 600 comprises first share linear maps 651a-653a, second share linear maps 651b-653b, first share XOR gates 613a, second share XOR gates 613b, first share completion detection 614a, second share completion detection 614b, AND gate 625, first share next stage 631a, and second share next stage 631b. In an embodiment, the elements of system 600 may reside on an integrated circuit.

A first share value $a_m$ is input to linear map 651a. The output of linear map 651a is provided to XOR gates 613a and the first share next stage 631a. The first share value $a_m$ XOR'd with a token value $t_m$ is input to linear map 652a.

The output of linear map 652a is provided to XOR gates 613a. A token value $t_m$ is input to linear map 653a. The output of linear map 653a is provided to completion detection 614a. The output of XOR gates 613a is compared with the output of linear map 653a by completion detection 614a. The output of completion detection 614a is provided to AND gate 625.

A second share value $m_a$ is input to linear map 651b. The output of linear map 651b is provided to XOR gates 613b and the second share next stage 631b. The second share value $m_t$ XOR'd with a token value $m_a$ is input to linear map 652b. The output of linear map 652b is provided to XOR gates 613b. A token value $m_t$ is input to linear map 653b. The output of linear map 653b is provided to completion detection 614a. The output of XOR gates 613b is compared with output of linear map 653b by completion detection 614b. The output of completion detection 614b is provided to AND gate 625. It should be understood that the linear maps 653a-653b for the synchronization tokens $t_m$ and $m_t$ can be pre-computed to avoid glitches at the input of the completion detectors 614a-614b.

The output of AND gate 625 (EN1) is used to enable data to propagate from linear maps 651a-651b to their respective next stages in system 500. Thus, it should be understood that EN1 is asserted only when the output of linear map 651a XOR'd with the output of linear map 652a is equal to the token value $t_m$ and the output of linear map 651b XOR'd with the output of linear map 652b is equal to the token value $m_t$.

In an embodiment, AND gate 625 may be skipped and two enable signals are generated EN1_1 and EN1_2, where EN1_1 is the output of 614a and EN1_2 is the output of 614b. The next stage logic 631a and 631b may receive the two separate enable signals EN1_1 and EN1_2. The DGM based AND circuitry in the stages 631a and 631b may receive two separate enable signals EN1_1 and EN1_2 and will enable the gate for each input share of the AND gate independently.

Figure 7:
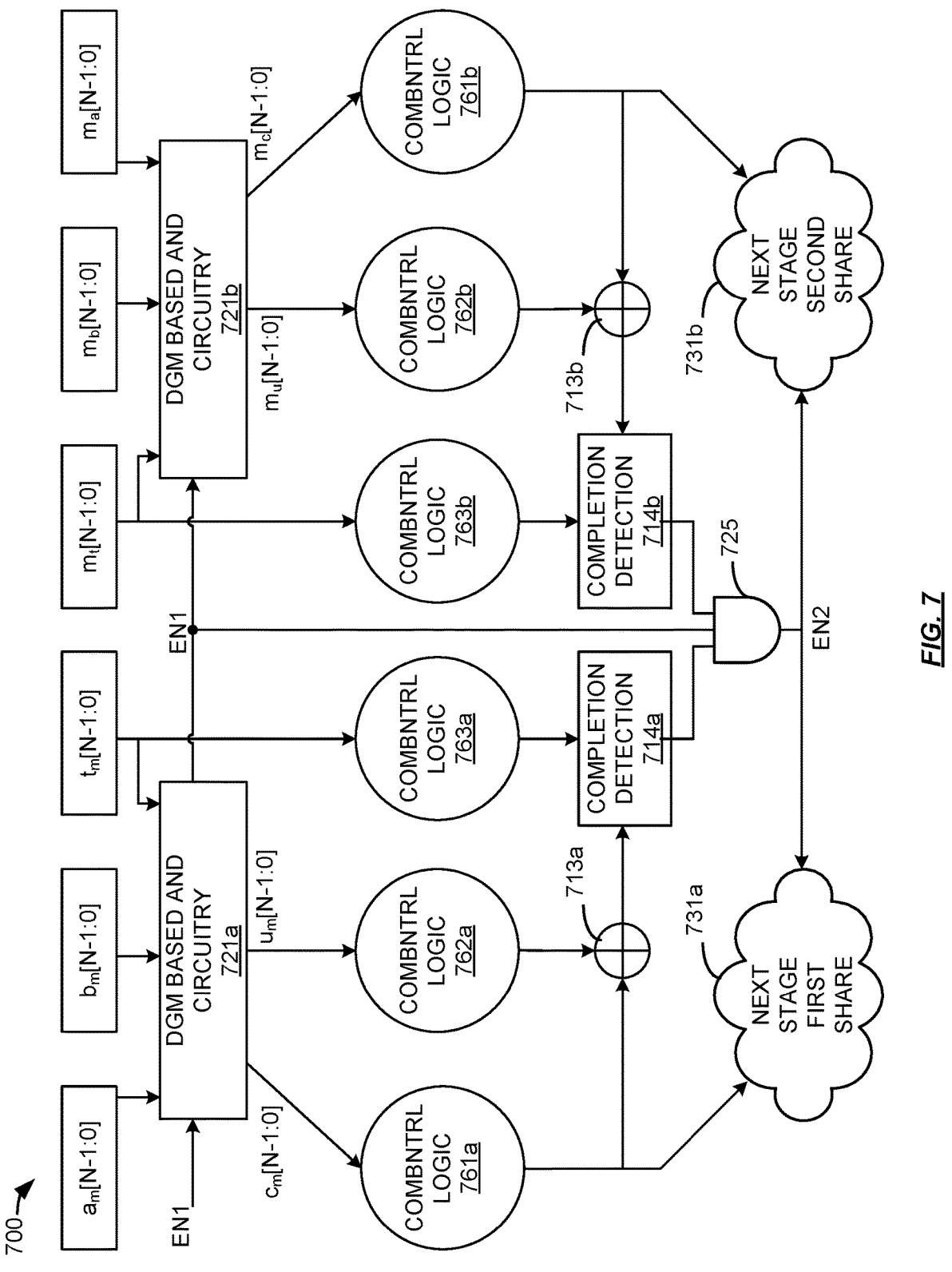
FIG. 7 is a block diagram illustrating stages 2-5 of a DGM based AES S-box.

FIG. 7 is a block diagram illustrating stages 2-5 of a DGM based AES S-box. In FIG. 7, system 700 comprises first share DGM based AND circuitry 721a, second share DGM based AND circuitry 721b, first share linear combinatorial logics 761a-763a, second share linear combinatorial logics 761b-763b, first share XOR gates 713a, second share XOR gates 713b, first share completion detection 714a, second share completion detection 714b, AND gate 725, first share next stage 731a, and second share next stage 731b. Linear combinatorial logics 761a-763a and second share linear combinatorial logics 761b-763b may be, for example XOR trees that are part of the AES S-box. In an embodiment, the elements of system 700 may reside on an integrated circuit.

In FIG. 7, an N bit first share value $a_m[N-1:0]$, an N bit second share value $b_m[N-1:0]$, and an N bit token value $t_m[N-1:0]$ are input to DGM based AND circuitry 721a. An enable signal EN1 is also input to DGM based AND circuitry 721a. When EN1 is asserted, DGM based AND circuitry 721a allow data to propagate to the outputs of DGM based AND circuitry 721a and produce a first output value $c_m[N-1:0]$ and a second output value $u_m[N-1:0]$.

The first output value $c_m[N-1:0]$ is input to linear combinatorial logic 761a. The second output value $u_m[N-1:0]$ is input to linear combinatorial logic 762a. The token value $t_m[N-1:0]$ is input to linear combinatorial logic 763a. The outputs of linear combinatorial logic 761a is XOR'd with the outputs of linear combinatorial logic 762a by XOR gates 713a. The output of XOR gates 713a is compared to the output of linear combinatorial logic 763a by completion detection 714a. The output of completion detection 714a is input to AND gate 725.

The second share DGM based AND circuitry 721b, second share linear combinatorial logics 761b-763b, second share XOR gates 713b, and second share completion detection 714b, operate in a like manner as first share DGM based AND circuitry 721a, first share linear combinatorial logics 761a-763a, first share XOR gates 713a, and first share completion detection 714a. Accordingly, repeating the previous description except directed to the second share circuitry is, for the sake of brevity, not necessary. It should be understood that linear combinatorial logic 763a-763b for the synchronization tokens $t_m$ and $m_t$ can be pre-computed to avoid glitches at the input of the completion detectors 714a-714b.

AND gate 725 receives the last stage's enable signal EN1, the output of completion detection 714a, and the output of completion detection 714b. The output of AND gate 725 (EN2) is used to enable data to propagate from DGM based AND circuitry 721a-721b to their respective next stages in system 500. Thus, it should be understood that EN2 is asserted only when the output of linear combinatorial logic 761a XOR'd with the output of linear combinatorial logic 762a is equal to the output of linear combinatorial logic 763a and the output of linear combinatorial logic 761b XOR'd with the output of linear combinatorial logic 762b is equal to the output of linear combinatorial logic 763b.

In an embodiment, AND gate 725 may be skipped and two enable signals are generated EN1_1 and EN1_2, where EN1_1 is the output of 714a and EN1_2 is the output of 714b. The next stage logic 731a and 731b may receive the two separate enable signals EN1_1 and EN1_2. The DGM based AND circuitry in the stages 731a and 731b may receive two separate enable signals EN1_1 and EN1_2 and will enable the gate for each input share of the AND gate independently.

FIG. 8 is a flowchart illustrating a method of gating based on a token. One or more steps illustrated in FIG. 8 may be performed by, for example, combinatorial logic 100, system 200, system 300, DGM based AND circuitry 400, system 500, system 600, system 700, and/or their components. A first masked output share of data-gating based masking (DGM) is generated based on a first input share value and a second share input value (802). For example, nonlinear gates 212 may generate the output value $c1[N-1:0]$ based on the input values $a1[N-1:0]$ and $b1[N-1:0]$.

A second output share of the DGM circuitry is generated based on a randomized first token value, the first input share value, and the second input share value (804). For example, nonlinear gates 211 may generate the output value $u1[N-1:0]$ based on the randomized token value $t1[N-1:0]$, and the input values $a1[N-1:0]$ and $b1[N-1:0]$. A first linearly processed regenerated token value is generated based on the first output share of the DGM circuitry and the second output share of the DGM circuitry (806). For example, XOR gates 213 may produce a linearly processed regenerated token value output 244 by performing a bitwise exclusive OR operation on the outputs of linear logic 231 and linear logic 232.

A first enable signal is output based on a linearly processed first token value and the linearly processed first regenerated token value (808). For example, based on the comparison by comparator 214 between the output 243 of linear logic 233 when linear logic 233 is receiving token value $t1[N-1:0]$ and the output 244 of XOR gates 213, AND gate 215 may assert the enable signal EN2 to enable non-linear gates 221 and nonlinear gates 222.

FIG. 9 is a flowchart illustrating a method of token compare based gating. One or more steps illustrated in FIG. 9 may be performed by, for example, combinatorial logic 100, system 200, system 300, DGM based AND circuitry 400, system 500, system 600, system 700, and/or their components. A first output share of data-gating based masking (DGM) circuitry is generated based on a first input share value and a second input share value (902). For example, nonlinear gates 212 may generate the output value c1[N−1:0] based on the input values a1[N−1:0] and b1[N−1:0].

A second output share of the DGM circuitry is generated based on a first token value, the first input share value, and the second input share value (904). For example, nonlinear gates 211 may generate the output value u1[N−1:0] based on the randomized token value t1[N−1:0], and the input values a1[N−1:0] and b1[N−1:0]. A linearly processed second token value is generated based on the first output share of the DGM circuitry and the second output share of the DGM circuitry (906). For example, XOR gates 213 may generate a linearly processed second token value output 244 by performing a bitwise exclusive OR operation the output 241 of linear logic 231 when linear logic 231 is receiving the values u1[N−1:0] and the output 242 of linear logic 232 when linear logic 232 is receiving c1[N−1:0].

A linearly processed first token value and the linearly processed second token value are compared (908). For example, comparator 214 may equality compare the output 244 of XOR gates 213 to the output 243 of linear logic 233 when linear logic 233 is receiving the token value t1[N−1:0]. Based on the comparison of the linearly processed first token value and the linearly processed second token value, the first input share of the following DGM circuitry and the second input share of the following DGM circuitry are allowed to propagate (910). For example, based on the comparison by comparator 214 between the output 243 of linear logic 233 and the output 244 of XOR gates 213, AND gate 215 may assert the enable signal EN2 to enable nonlinear gates 221 and nonlinear gates 222 to evaluate and propagate a2[M−1:0] and b2[M−1:0].

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of combinatorial logic 100, system 200, system 300, DGM based AND circuitry 400, system 500, system 600, system 700, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

FIG. 10 is a block diagram illustrating one embodiment of a processing system 1000 for including, processing, or generating, a representation of a circuit component 1020. Processing system 1000 includes one or more processors 1002, a memory 1004, and one or more communications devices 1006. Processors 1002, memory 1004, and communications devices 1006 communicate using any suitable type, number, and/or configuration of wired and/or wireless connections 1008.

Processors 1002 execute instructions of one or more processes 1012 stored in a memory 1004 to process and/or generate circuit component 1020 responsive to user inputs 1014 and parameters 1016. Processes 1012 may be any suitable electronic design automation (EDA) tool or portion thereof used to design, simulate, analyze, and/or verify electronic circuitry and/or generate photomasks for electronic circuitry. Representation 1020 includes data that describes all or portions of combinatorial logic 100, system 200, system 300, DGM based AND circuitry 400, system 500, system 600, system 700, and their components, as shown in the Figures.

Representation 1020 may include one or more of behavioral, register transfer, logic component, transistor, and layout geometry-level descriptions. Moreover, representation 1020 may be stored on storage media or communicated by carrier waves.

Data formats in which representation 1020 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1014 may comprise input parameters from a keyboard, mouse, voice recognition interface, microphone and speakers, graphical display, touch screen, or other type of user interface device. This user interface may be distributed among multiple interface devices. Parameters 1016 may include specifications and/or characteristics that are input to help define representation 1020. For example, parameters 1016 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1004 includes any suitable type, number, and/or configuration of non-transitory computer-readable storage media that stores processes 1012, user inputs 1014, parameters 1016, and circuit component 1020.

Communications devices 1006 include any suitable type, number, and/or configuration of wired and/or wireless devices that transmit information from processing system 1000 to another processing or storage system (not shown) and/or receive information from another processing or storage system (not shown). For example, communications devices 1006 may transmit circuit component 1020 to another system. Communications devices 1006 may receive processes 1012, user inputs 1014, parameters 1016, and/or circuit component 1020 and cause processes 1012, user inputs 1014, parameters 1016, and/or circuit component 1020 to be stored in memory 1004.

Implementations discussed herein include, but are not limited to, the following examples:

Example 1: An integrated circuit, comprising: first non-linear masked circuitry to, in response to a first enable signal, generate a first intermediate value for a masked logic operation; second nonlinear masked circuitry to, in response to the first enable signal and based on a first randomized comparison value, generate a second intermediate value for the masked logic operation; regeneration circuitry to, based on the first intermediate value and the second intermediate value, generate a regenerated first comparison value; and, comparison circuitry to, based on the first randomized comparison value and the regenerated first comparison value, generate a second enable signal.

Example 2: The integrated circuit of example 1, further comprising: third nonlinear masked circuitry to, in response to the second enable signal, generate a third intermediate value for the masked logic operation.

Example 3: The integrated circuit of example 2, further comprising: fourth nonlinear masked circuitry to, in response to the second enable signal and based on a second randomized comparison value, generate a fourth intermediate value for the masked logic operation.

Example 4: The integrated circuit of example 1, wherein the regeneration circuitry comprises an exclusive-OR function.

Example 5: The integrated circuit of example 1, wherein the masked logic operation is included in a cryptographic operation.

Example 6: The integrated circuit of example 1, wherein the masked logic operation implements an AND gate.

Example 7: The integrated circuit of example 1, further comprising: a register storing the first randomized comparison value.

Example 8: An integrated circuit, comprising: first masked circuitry to compute a first masked output value from at least a first share value and a second share value; second masked circuitry to compute a second masked output value from at least a randomized first token value, the first share value, and the second share value; first regeneration circuitry to compute a first regenerated token value; and, first enable signal circuitry to output a first enable signal based on the first token value and the first regenerated token value.

Example 9: The integrated circuit of example 8, further comprising: third masked circuitry to, in response to the first enable signal, compute a third masked output value from at least the first masked output value.

Example 10: The integrated circuit of example 9, further comprising: fourth masked circuitry to, in response to the first enable signal, compute a fourth masked output value from at least the randomized first token value and the first masked output value.

Example 11 The integrated circuit of example 10, further comprising: second regeneration circuitry to compute a second regenerated token value.

Example 12: The integrated circuit of example 11, further comprising: second enable signal circuitry to output a second enable signal based on the first token value and the second regenerated token value.

Example 13: The integrated circuit of example 8, wherein the first regeneration circuitry comprises an exclusive-OR function.

Example 14: The integrated circuit of example 8, wherein the first masked circuitry is included in a cryptographic operation.

Example 15: The integrated circuit of example 8, wherein the first masked circuitry implements a masked AND gate.

Example 16: A method, comprising: generating a first output share of data gate based masking (DGM) circuitry based on a first input share value and a second input share value; generating a second output share of the DGM circuitry based on a first token value, the first input share value, and the second input share value; generating a linearly processed first regenerated token value based on the first output share of the DGM circuitry and the second output share of the DGM circuitry; and, outputting a first enable signal based on a linearly processed first token value and the linearly processed first regenerated token value.

Example 17: The method of example 16, further comprising: in response to the first enable signal, generating a third output share of the DGM circuitry based on at least the first output share.

Example 18: The method of example 17, further comprising: in response to the first enable signal, generating a fourth output share of the DGM circuitry base on at least the randomized first token value and the first output share.

Example 19: The method of example 18, further comprising: generating a linearly processed second regenerated token value based on the third output share and the fourth output share.

Example 20: The method of example 19, further comprising: outputting a second enable signal based on the linearly processed first token value and a linearly processed second regenerated token value.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
first masked circuitry to compute a first masked output value from at least a first share value and a second share value;
second masked circuitry to compute a second masked output value from at least a randomized first token value, the first share value, and the second share value;
first regeneration circuitry to compute a first regenerated token value; and,
first enable signal circuitry to output a first enable signal based on the randomized first token value and the first regenerated token value.

2. The integrated circuit of claim 1, further comprising:
third masked circuitry to, in response to the first enable signal, compute a third masked output value from at least the first masked output value.

3. The integrated circuit of claim 2, further comprising:
fourth masked circuitry to, in response to the first enable signal, compute a fourth masked output value from at least the randomized first token value and the first masked output value.

4. The integrated circuit of claim 3, further comprising:
second regeneration circuitry to compute a second regenerated token value.

5. The integrated circuit of claim 4, further comprising:

second enable signal circuitry to output a second enable signal based on the randomized first token value and the second regenerated token value.

6. The integrated circuit of claim 1, wherein the first regeneration circuitry comprises an exclusive-OR function.

7. The integrated circuit of claim 1, wherein the first masked circuitry is included in a cryptographic operation.

8. The integrated circuit of claim 1, wherein the first masked circuitry implements a masked AND gate.

9. A method, comprising:

generating a first output share of data gate based masking (DGM) circuitry based on a first input share value and a second input share value;

generating a second output share of the DGM circuitry based on a randomized first token value, the first input share value, and the second input share value;

generating a linearly processed first regenerated token value based on the first output share of the DGM circuitry and the second output share of the DGM circuitry; and, outputting a first enable signal based on a linearly processed first token value and the linearly processed first regenerated token value.

10. The method of claim 9, further comprising:

in response to the first enable signal, generating a third output share of the DGM circuitry based on at least the first output share.

11. The method of claim 10, further comprising:

in response to the first enable signal, generating a fourth output share of the DGM circuitry base on at least the randomized first token value and the first output share.

12. The method of claim 11, further comprising:

generating a linearly processed second regenerated token value based on the third output share and the fourth output share.

13. The method of claim 12, further comprising:

outputting a second enable signal based on the linearly processed first token value and a linearly processed second regenerated token value.

\* \* \* \* \*